Patented Apr. 17, 1951

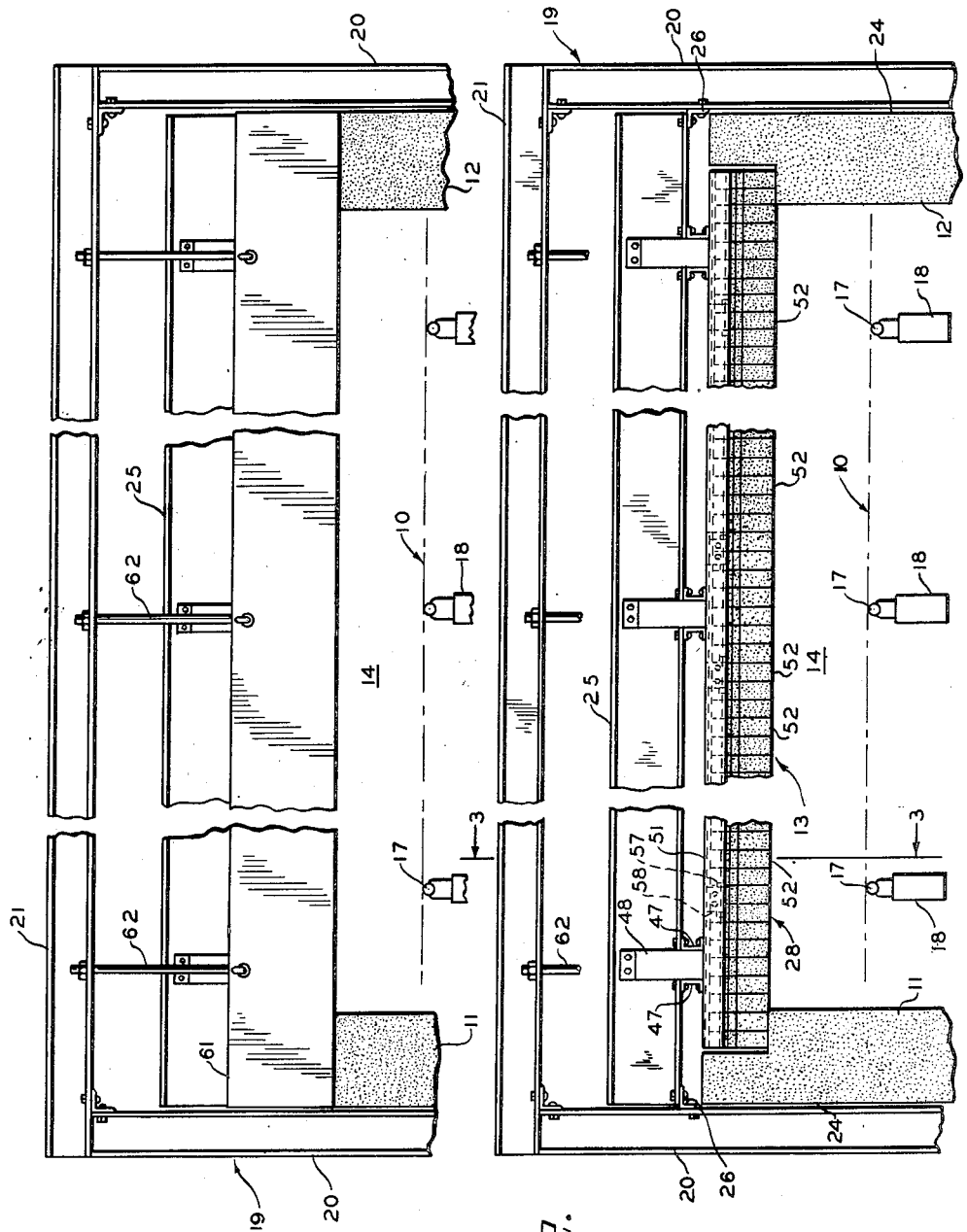

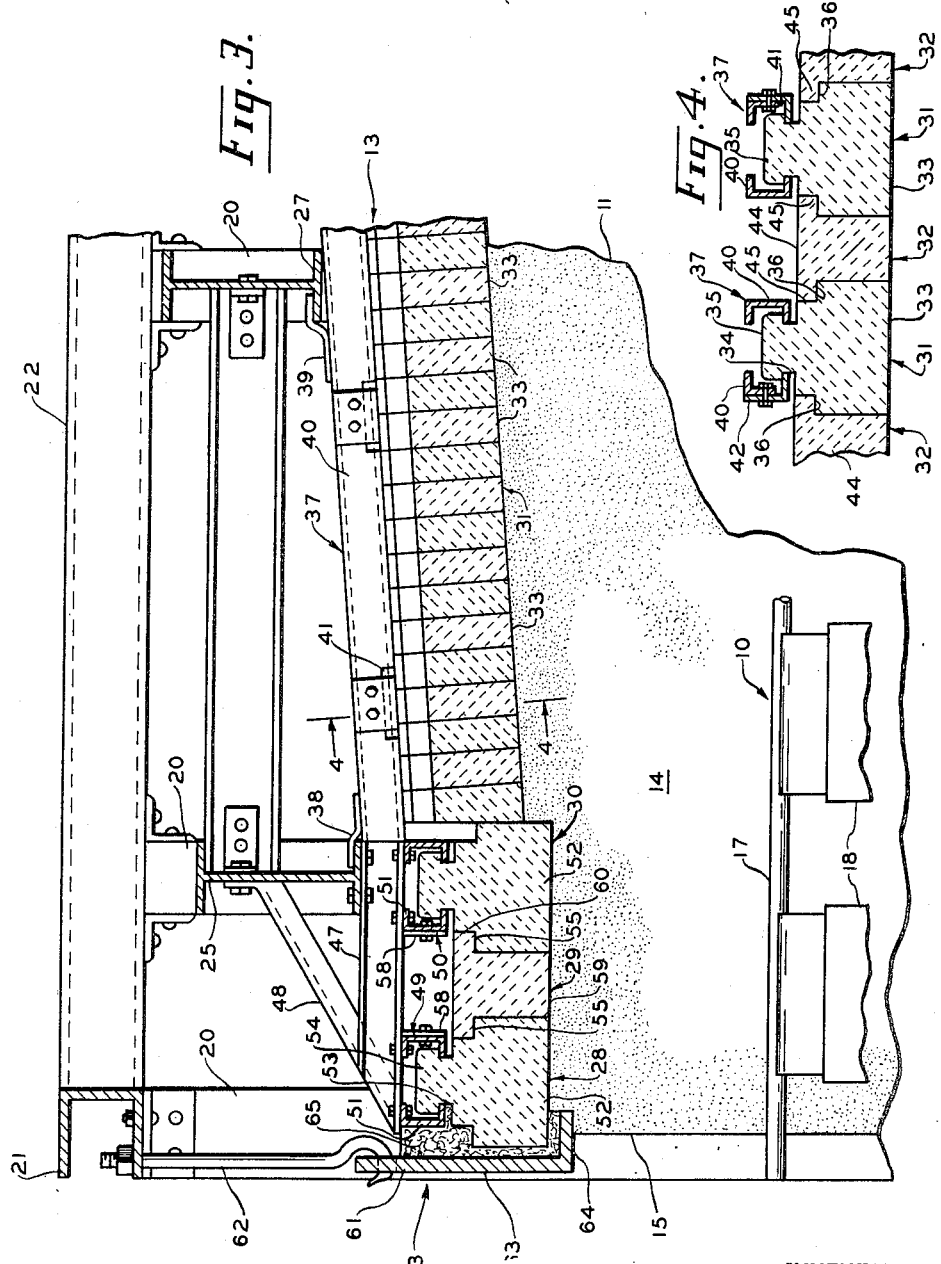

2,549,742

UNITED STATES PATENT OFFICE 2,549,742

HEATING FURNACE

John Yoxall, Detroit, Mich., assignor to National Steel Corporation, a corporation of Delaware Application January 11, 1949, Serial No. 70,157

6 Claims. (Cl. 263—46)

This invention relates to improvements in heating furnaces for heating relatively heavy metal bodies such as billets, blooms, slabs and the like and more particularly to continuous heating furnaces wherein the bodies are continuously charged into one end of the furnace, moved through the furnace and heated and are then removed from the furnace at the opposite end.

Continuous heating furnaces of this general type are used in steel plants and a furnace of this type is shown and described in Patent No. 1,912,933 to A. L. Culbertson.

In a continuous heating furnace of this type, there is an elongated hearth extending the length of the heating chamber and a roof of refractory brick over the hearth suspended from the surrounding framework by a suitable superstructure. The charge and discharge openings are at opposite ends of the hearth. The relatively heavy bodies to be heated are pushed through the charge opening onto the hearth, and, as bodies are subsequently pushed into the furnace, the previously charged bodies are advanced along the hearth and finally moved out of the furnace through the discharge opening. The charge opening is relatively small to minimize heat loss, and the roof structure includes a mantel adjacent the upper edge of the opening and supported by the framework supporting the remainder of the roof structure. At times, and for various reasons, the bodies being pushed into the furnace strike against the mantel at the edge of the roof structure adjacent the upper edge of the charge opening. While the mantel affords some protection for the brickwork, the impact of such a heavy body is quite severe and causes spalling of the bricks adjacent the opening. As a result, these bricks must be replaced quite frequently which is expensive and time consuming.

Accordingly, it is an object of the present invention to provide a heating furnace so constructed and arranged that the bricks of the roof adjacent the charge opening will have a relatively longer life.

Another object of the present invention is to provide an improved heating furnace in which the roof structure is constructed and arranged to absorb the blows of bodies striking the edge of the roof structure adjacent the charge opening and decrease damage to the brickwork of the roof.

Another object of the present invention is to provide an improved heating furnace in which the brickwork of the roof is arranged in a novel manner better to withstand heavy blows to reduce damage to the brickwork.

These and other objects and the advantages of the present invention will become more readily apparent from the following detailed description, taken with the accompanying drawings, in which:

Figure 1 is a front elevational view of the upper portion of a continuous heating furnace embodying the principles of the present invention;

Figure 2 is a view similar to Figure 1 with portions removed, better to show the interior construction;

Figure 3, is an enlarged, fragmentary sectional view taken along line 3—3 of Figure 1; and Figure 4 is a fragmentary sectional view taken along line 4—4 of Figure 3.

Referring to the drawings, the continuous heating furnace, shown in part, includes a hearth 10, sidewalls 11 and 12 of suitable refractory material, such as refractory brick, and a roof structure 13 which together define an elongated heating chamber 14 having a charge opening or entrance 15 at one end. A discharge opening, not shown, is provided at the opposite end of the heating chamber. The furnace includes means, not shown, for maintaining an elevated heating temperature in the chamber 14. The heating means may be of any suitable type, and the particular type of heating means used forms no part of the present invention. Regenerative heating is often employed for such furnaces.

The hearth 10 includes a plurality of skids or rails 17 extending lengthways of the hearth and supported by piers 18. The rails 17 support the bodies while being heated and while moving through the chamber 14. In operation, the bodies to be heated such as steel slabs, billets, bars, packs of sheets or other relatively heavy massive bodies are pushed one by one through the furnace opening 15 onto the rails 17. As other bodies are subsequently pushed into the furnace, the bodies in the furnace are pushed along the rails 17 and finally out the discharge opening at the discharge end of the furnace in the heated condition for further processing.

The heating furnace includes a supporting and reinforcing framework 19 made up of steel structural members. The framework 19 includes upright members or studs 20 spaced along both sides of the furnace and beams or joists 21 and 22 connecting the upper ends of the members 20 to form a skeleton-like framework reinforcing the sidewalls 11 and 12 and supporting the roof structure 13. The members 20 on each side of the furnace support plate-like members 24 which in turn engage and support the corresponding sidewalls 11 or 12. Between the stud members 20, adjacent to but spaced from the charge end of the furnace, there extends a large beam 25. A bracket member 26 at each end of beam 25 is fastened to the beam and the adjacent stud member 20 by means of rivets. Between the other studs, there extend similar beams 27. Only one beam 27 is shown. The beams 25 and 27 form part of the furnace framework 19 supporting the roof 13.

The roof 13 includes a plurality of refractory bricks arranged in courses or rows with the rows arranged side by side to form a continuous, substantially gas-tight roof wall. The three courses of bricks 28, 29 and 30 adjacent the charge end of the furnace extend transversely across the hearth 14 and the remainder of the brickwork of roof 13 is made up of bricks arranged in courses or rows extending rearwardly from row 30 and extending longitudinally of the furnace. The brickwork in this latter portion of the roof is made up of alternate rows 31 and 32, with the bricks in the rows 31 being similar and the bricks in rows 32 being similar. Each two adjacent rows 31 are spaced apart and support an intermediate row 31, Figure 4. Each brick 33 of each row 31 has a greater length than width and the bricks are arranged with their length extending transversely of the row 31. Each brick 33 has a neck 34 of reduced size topped by a head 35. At each end of each brick 33 there is a shoulder 36 and the bricks 33 of each row 31 are supported by a corresponding hanger 37 extending longitudinally of the elongated chamber 14. The hangers 37 are each supported at one end by a clip 38 which engages a flange of beam 25 and are supported throughout their length by clips 39 which engage the beams 27. Each hanger includes a pair of opposed U-shaped channel members 40 spaced apart to receive the heads 35 of the bricks 33. Slots 41 are provided at spaced points along channel members 40 to permit insertion of the heads 35 of the bricks. A clip 42 is bolted in place after the bricks 33 have been placed in the hangers to support the brick or bricks adjacent the slots. Between each two rows 31 of bricks 33, there is a row of bricks 32 made up of similar bricks 44 each having an upper flange 45 which fits the shoulder 36 of the adjacent brick 33 so that the hangers 37 or super-structure carried by framework 19 supports all of the rows 31 and 32. Each brick 44 of each row 32 has a greater length than width and the brick 44 is arranged so that its length extends transversely of the row 32 and of the elongated chamber 14. By having the bricks 33 and 44 arranged with their greatest dimension extending laterally of the row, the roof has a fewer number of rows of bricks and a fewer number of seams therebetween which is a more desirable type of construction.

Referring more particularly to Figures 2 and 3, a plurality of pairs of channel members 47 are fastened at one end to beam 25 and extend forwardly from the beam toward the charge end of the furnace. A brace 48 is fastened at one end to beam 25 and to the outer ends of each pair of members 47. The channel members 47 support a pair of similar hangers 49 and 50. Each hanger 49 and 50 is similar to hanger 37 but extends laterally across the hearth chamber. The hanger 49 supports the row of bricks 29 and hanger 50 supports the row of bricks 30. Each hanger 49 and 50 includes a pair of opposed channel members 51. The bricks 52 of each row 29 and 30 are similar to bricks 33 and each brick 52 has a neck 53 and a head 54 and presents a shoulder 55 at each end. One channel member 51 of each hanger 49 and 50 has slots 57 spaced along its length to permit insertion of the heads 54 of bricks 52. A bracket 58 is fastened in place at each slot 57 after the brick heads have been inserted to hold those bricks that are adjacent the slots. Bricks 59 of row 29 are similar to bricks 44, and each brick 59 has side flanges 60 fitting the shoulders 55 of the adjacent bricks 52. Each row of bricks 28, 29 and 30 extends laterally across the chamber 14, and each brick in these rows has a greater length than width. The bricks 52 and 44 are arranged with their length or greatest dimension extending transversely of the rows and extending longitudinally of the chamber 14.

The furnace includes a mantel 61 extending across and adjacent the upper edge of the charge opening 15 to heating chamber 14. The mantel 61 is supported at each end on the upright side members 20 of the framework and is supported at spaced points throughout its length by hangers 62 depending from the beam 21. The mantel 61 is a heavy steel member and protects the brickwork of the roof 13. While mantel 61 is a heavy, strong structural member, the impact of a heavy body such as a steel slab against the mantel 61 when being charged to the furnace will jar the mantel and move it.

In accordance with the present invention, the roof is constructed and arranged better to absorb the force of a body striking against mantel 61. The mantel 61 includes a vertical face plate 63 extending across and in front of the row 28 of bricks that is adjacent the opening 15 and includes a flange 64 extending inwardly from plate 63 beneath the row of bricks 28. The mantel plate 63 and flange 64 are spaced from the row of bricks 28, and the space therebetween is filled with a finely divided, resilient and resistant packing 65. The packing 65 seals the space between the mantel 61 and the brickwork to prevent the escape of hot gases through the space. The resilient packing may be asbestos fibers, rock wool, glass wool or other heat resistant, resilient material. A very important feature of the present arrangement is that the packing 65 is resilient and that there is no direct contact between mantel 61 and the bricks in row 28. When a body strikes against the mantel 61, the mantel is jarred and the packing 65 absorbs the blow so that the force of the impact is not fully transmitted to the bricks in rows 28, 29 and 30 which would cause excessive spalling of the bricks in these rows, particularly row 28. If the mantel 61 were in engagement with the brickwork or if packing 65 were solid and not resilient, a blow against the mantel would be transmitted directly to the brickwork, and excessive spalling would result. Accordingly, with the present arrangement, both the mantel 61 and the brickwork of the roof are supported by the furnace framework in such a manner that blows against the edge of the roof adjacent the charge are absorbed and not transmitted directly to the brickwork of the roof.

Another important feature of the present invention is the arrangement of the rows of bricks 28, 29 and 30, and particularly row 28, so that the bricks in these rows can better withstand blows without spalling. As hereinbefore pointed out, the major portion of the bricks in the roof are arranged in rows 31 and 32 extending longitudinally of the chamber 14 with the bricks in each row arranged with their greatest dimension extending laterally of the row and of the furnace so that there is a minimum number of rows and seams. The rows of bricks 28, 29 and 30, and particularly the bricks of row 28, are arranged in each row with their greatest dimension extending transversely of the row and longitudinally of the furnace. With the bricks in the rows adjacent the charge opening arranged in this manner, each brick presents its greatest dimension or length in the direction of application of a blow against the mantel so that the bricks better withstand a blow against the mantel and the bricks do not as readily break or spall.

In operation of the furnace, the charge opening 15 usually is high enough to permit pushing a slab into the furnace through the opening with a minimum clearance between the top of the slab and the lower edge of the roof. At times, a slab may be tilted as it is pushed into the furnace or may be deformed and for these and other reasons the slab will strike against the mantel. These slabs and other bodies pushed into the furnace are very heavy so that the blow of such a body against the mantel 61 is quite severe. It has been found that with the present construction spalling of the bricks is greatly reduced, and the life of the roof is greatly increased. The blow of a slab against the mantel is at least partially absorbed by the resilient packing 65 so that a relatively much lighter blow is applied against the ends of the bricks. The bricks adjacent the charge opening are arranged better to withstand blows against the edge of the roof which further reduces spalling. By absorbing the force of the blows and arranging the bricks better to withstand shock, spalling of the brick is reduced to a minimum.

The flange 64 of mantel 61 may be omitted but is preferably provided as it supports the packing, and, what is more important, the flange 64 provides protection for the bottom of the bricks in row 28. In addition, the resilient, heat resistant packing 65 may be used without having the bricks adjacent the charge opening arranged with their length extending longitudinally of the furnace. Such an arrangement would be an improvement and would reduce spalling of the bricks, but, by arranging the bricks as described, spalling is further reduced and is preferred.

I claim:

1. In a continuous heating furnace for heating bodies such as billets, blooms, slabs and the like, the combination comprising, a roof including a lining of suspended refractory brickwork defining the top of an elongated heating chamber having a charge opening at one end thereof through which the bodies to be heated are charged, a mantel extending across and in front of the outer edge portion of the roof brickwork adjacent the charge opening and adjacent to but spaced from the brickwork and resilient subdivided refractory packing material between the mantel and brickwork of the roof to inhibit the escape of gases therebetween and to absorb impact blows against the mantel and protect the brickwork.

2. In a continuous heating furnace for heating bodies such as billets, blooms, slabs and the like, the combination comprising, a roof including a lining of suspended refractory brickwork defining the top of an elongated heating chamber having a charge opening at one end thereof through which the bodies to be heated are charged, and a mantel extending across and in front of the outer edge portion of the roof brickwork adjacent the charge opening, said roof brickwork including a minor portion of the brickwork comprising at least one course of refractory bricks extending across the furnace adjacent the charge opening and a major portion of the brickwork comprising courses of refractory bricks extending side by side rearwardly from the minor portion and longitudinally of the heating chamber, the bricks having a greater length than width and being arranged in each course with their length extending transversely of the course whereby the bricks adjacent the charge opening have relatively greater resistance to impact blows.

3. In a continuous heating furnace for heating bodies such as billets, blooms, slabs and the like, the combination comprising, a roof including a lining of suspended refractory brickwork defining the top of an elongated heating chamber having a charge opening at one end thereof through which the bodies to be heated are charged, a mantel extending across and in front of the outer edge portion of the roof brickwork adjacent the charge opening, said mantel defining the upper edge of the charge opening and being adjacent to but spaced from the brickwork, resilient subdivided refractory packing material between the mantel and brickwork of the roof to inhibit the escape of gases therebetween and to absorb impact blows against the mantel and protect the brickwork, and said roof brickwork including a minor portion of the brickwork comprising at least one course of refractory bricks extending across the furnace adjacent the charge opening and a major portion of the brickwork comprising courses of refractory bricks extending side by side rearwardly from the minor portion and longitudinally of the heating chamber, the bricks having a greater length than width and being arranged in each course with their length extending transversely of the course whereby the bricks adjacent the charge opening have relatively greater resistance to impact blows.

4. In a continuous heating furnace for heating bodies such as billets, blooms, slabs and the like, the combination comprising, a roof including a lining of suspended refractory brickwork defining the top of an elongated heating chamber having a charge opening at one end thereof through which the bodies to be heated are charged, an external framework supporting the roof, and a mantel supported by said framework and extending across and in front of the outer edge portion of the roof brickwork adjacent the charge opening, said mantel defining the upper edge of the charge opening, and said roof brickwork including three courses of refractory bricks extending laterally across the furnace adjacent the charge opening and courses of refractory bricks extending rearwardly from said three courses and longitudinally of the heating chamber, each of the bricks having a greater length than width and being arranged in each course with their length extending transversely of the course whereby the bricks adjacent the charge opening have relatively greater resistance to impact blows.

5. In a continuous heating furnace for heating bodies such as billets, blooms, slabs and the like, the combination comprising, a roof including a lining of suspended refractory brickwork defining the top of an elongated heating chamber having a charge opening at one end thereof through which the bodies to be heated are charged, an external framework supporting the roof, a mantel supported by the framework extending across and in front of the outer edge portion of the roof brickwork adjacent the charge opening, said mantel defining the upper edge of the charge opening and being adjacent to but spaced from the brickwork, and resilient subdivided refractory packing material between the mantel and the brickwork of the roof to inhibit the escape of gases therebetween and to absorb impact blows against the mantel and protect the brickwork, said roof brickwork including three courses of refractory bricks extending side by side laterally across the furnace immediately adjacent the charge opening and other courses of refractory bricks extending side by side rearwardly from said three courses and longitudinally of the heating chamber, the bricks each having a greater length than width and being arranged in each course with their length extending transversely of the course whereby the bricks in said three courses adjacent the charge opening have relatively greater resistance to impact blows.

6. In a continuous heating furnace for heating bodies such as billets, blooms, slabs and the like, the combination comprising, a roof including a lining of suspended refractory brickwork defining the top of an elongated heating chamber having a charge opening at one end thereof through which the bodies to be heated are charged, an external framework supporting the roof, a mantel supported by the framework, said mantel including an upright portion extending across and in front of the outer edge portion of the roof brickwork immediately adjacent the charge opening and being adjacent to but spaced outwardly from the brickwork and including a portion extending from the upright portion inwardly beneath the outer edge portion of the brickwork and defining the upper edge of the charge opening and being adjacent to but spaced below the brickwork, and resilient subdivided refractory packing material between the mantel portions and the brickwork of the roof to inhibit the escape of gases therebetween and to absorb impact blows against the mantel and protect the brickwork, said roof brickwork including three courses of refractory bricks extending side by side laterally across the furnace immediately adjacent the charge opening and other courses of refractory bricks extending side by side rearwardly from said three courses and longitudinally of the heating chamber, the bricks each having a greater length than width and being arranged in each course with their length extending transversely of the course whereby the bricks in said three courses adjacent the charge opening have relatively greater resistance to impact blows.

JOHN YOXALL.

REFERENCES CITED

The following references are of record in the file of this patent:

UNITED STATES PATENTS

| Number | Name | Date |
| --- | --- | --- |
| 1,440,446 | Cotton | Jan. 2, 1923 |
| 1,885,800 | Burnet | Nov. 1, 1932 |
| 2,235,771 | McDermot | Mar. 19, 1941 |
| 2,295,474 | Horn | Sept. 8, 1942 |
| 2,444,365 | Pluck | June 29, 1948 |

OTHER REFERENCES

Pages 316 and 317 of Trinks' "Industrial Furnaces," vol. I, 3rd edition, copyright 1934. This text is published by John Wiley and Sons, N. Y., N. Y.